United States Patent
LiVecchi

(10) Patent No.: US 7,356,695 B2
(45) Date of Patent: Apr. 8, 2008

(54) MULTI-LEVEL SECURITY SYSTEMS

(75) Inventor: Patrick Michael LiVecchi, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 10/210,267

(22) Filed: Aug. 1, 2002

(65) Prior Publication Data

US 2007/0277034 A1    Nov. 29, 2007

(51) Int. Cl.
*H04L 9/00* (2006.01)
(52) U.S. Cl. .......................... 713/166; 726/2
(58) Field of Classification Search .............. 713/1, 713/2, 188, 194, 166; 380/200, 201, 255, 380/277; 726/2
See application file for complete search history.

(56) References Cited

U.S. PATENT DOCUMENTS

| | | | |
|---|---|---|---|
| 6,023,765 A * | 2/2000 | Kuhn | 726/4 |
| 6,154,839 A * | 11/2000 | Arrow et al. | 713/154 |
| 6,304,973 B1 * | 10/2001 | Williams | 726/3 |
| 6,480,963 B1 * | 11/2002 | Tachibana et al. | 726/4 |
| 6,879,587 B1 * | 4/2005 | Yadav et al. | 370/389 |
| 7,114,005 B2 * | 9/2006 | McDaniel | 709/245 |
| 2003/0182431 A1 * | 9/2003 | Sturniolo et al. | 709/227 |

* cited by examiner

*Primary Examiner*—Kim Vu
*Assistant Examiner*—Joseph Pan
(74) *Attorney, Agent, or Firm*—Marcia L. Doubet; Jeanine S. Ray-Yarletts

(57) ABSTRACT

Techniques are disclosed for improving multi-level security ("MLS") in computing systems. Communication between MLS systems in the prior art requires explicitly tagging each packet with its security classification. The packet tags comprise variable-length bit patterns inserted into packet headers. This results in a number of drawbacks, including increased path length and code complexity, as well as reduced interoperability. An MLS system according to the present invention simulates a cluster or collection of single-level security systems, and thereby avoids packet tagging. For each security classification used by an MLS system, a distinct source address is defined. This source address is used for outbound packets having that security classification, such that the packet's source address implicitly identifies the packet's security classification.

6 Claims, 6 Drawing Sheets

FIG. 1
(Prior Art)

| Partner ID | Security Label | | Route |
|---|---|---|---|
| | Classification | Category | |
| 4.3.2.1 | Secret | Finance | WAN |
| 8.7.6.5 | Top secret | Planning | WAN |
| 12.11.10.9 | Secret | Personnel | LAN |

MULTI-LEVEL SECURITY SYSTEMS

BACKGROUND OF THE INVENTION

1. Field of the Invention

The present invention relates to computer programming, and deals more particularly with techniques for improving systems that support multiple levels of security (e.g., multiple classifications such as "top secret", "secret", and so forth) such that those systems do not need to explicitly specify the security level on each data packet they transmit.

2. Description of the Related Art

Governmental agencies and other entities often assign security classifications to data, in order to control access to that data. Security classifications used in the U.S. Department of Defense, for example, include "top secret" and "secret". A corporation might use security classifications such as "confidential" and "internal use only". Typically, these security classifications have a hierarchical structure, so that a user or process having access to a particular classification also has access to less-sensitive classifications. Using the governmental example, a user with "top secret" clearance is typically allowed to access data having this classification and also data having the less-sensitive "secret" classification. In addition to controlling access to data using security classifications, access to application programs may also be restricted using classifications.

When security-sensitive information must be transmitted over a communications network, it is necessary to ensure that the security classification of that data is enforced, allowing only authorized users/processes to receive security-sensitive information. Similarly, it is necessary to ensure that only authorized users (including human users and programmatic processes) are permitted to access applications. Systems are known in the art that provide various types of access restrictions for data and for applications. (Hereinafter, references to controlling access to data/information or to controlling access to applications are intended to be synonymous.)

One technique for controlling access is based on the access privileges of individual users, where those access rights are established on a per-user-session basis. For example, when a user logs in to an application, he may be required to provide a user identifier and password. The user-provided values can then be used to consult a stored repository of user access privileges. The privileges for this user can then be used to control what type of information the user can access during the current user session. Typically, the values in such repositories are maintained by a person such as a systems administrator or security administrator.

Additional or different information might be used to determine a user's access privileges. For example, in addition to the user identifier and password, a device identifier of the device from which the user logged in might be used. This technique may be especially useful if stored information exists about physical locations of particular devices, where the physical location is important in determining the user's current access privileges. A user "Bob", for example, might be authorized to view data classified as "confidential", provided he is using his office workstation. If he is using his portable computer in a public place, on the other hand, he might only be authorized to view data that is considered "unclassified". Or, if sufficient physical security restrictions are in place, then access privileges might be determined solely on the basis of the device identifier (or its network address) of a user's device. For example, users might be required to establish their identity using employee badges or biometric information before being allowed to enter a restricted area, where that restricted area includes computer workstations for use by anyone who enters the area.

A particular back-end system or server may be supporting many user sessions concurrently. The term "multi-level security" ("MLS") system is used to refer to systems that support user sessions having more than one security classification. For example, a document server at a government agency might receive and answer requests for a wide variety of stored documents, and this server may then be required to send data to requesters having various access privileges. Thus, this MLS system must ensure that the appropriate security semantics are enforced for each user session. In contrast, the term "single-level security" ("SLS") system is used herein to refer to systems that support user sessions that all have a single (identical) security classification. As an example of an SLS system, a document server for public use might receive and answer requests only for unclassified information.

In some cases, access controls in SLS systems are hard-coded, and thus no log-on checking or authorization process is needed. MLS systems, on the other hand, require some type of authorization to determine which security classification is appropriate for each user session.

Maintaining proper access controls is made more difficult if the server or back-end MLS system needs to contact another system. For example, the application with which a user is communicating may trigger remote invocation of another process, or may exchange data with another process. In such cases, it is necessary to ensure that the user's access privileges are still enforced. If the target system is an SLS system, prior art techniques preserve the security semantics of the user session through use of configuration data that specifies, on a per-SLS basis, the security classification that is permissible for communicating with that target SLS system. If the configured classification level is the level needed by the MLS system, then the communication can proceed. (Because of the hierarchical nature of security classifications, the communication may, in some cases, be allowed to proceed if the configuration data indicates that the target SLS system supports a higher-level classification.) However, if the MLS system needs a classification level higher than what this target SLS system provides, then the communication cannot proceed. Typically, the configuration information identifies each permissible target SLS system by its Internet Protocol, or "IP", address. Or, a range of IP addresses may be used to identify a group of SLS systems having the same security classification.

Prior art systems do not use this configuration data approach when an MLS system is communicating with another MLS system, however, because the IP address of the target MLS system would be ambiguous (i.e., it would not uniquely identify a classification level at the target system). Instead, prior art systems use a technique known in the art as "packet tagging", whereby each transmitted packet is tagged with information indicating the security classification of that packet. In this manner, one MLS system can exchange data of multiple security classifications with another (target) MLS system, and each system can distinguish among the data packets for the various classifications. The packet tagging comprises appending a particular (variable-length) bit pattern to the header of each outbound packet, where the bit pattern conveys the security classification of the transmitted data. Thus, if MLS system "A" and MLS system "B" exchange data for a number of different security classifications, the classification for each inbound packet can be determined by inspecting the appended bit pattern in the packet header. (The receiving MLS system can then determine, for example, whether it should allow this inbound data packet to pass on to its destination.)

While these prior art packet tagging techniques are functionally sufficient, they have a number of drawbacks. First, packet tagging is computationally expensive. That is, the sender must determine the correct bit pattern to add to each packet, and then modify each packet header to include this bit pattern; the receiver must inspect each incoming packet for its bit pattern, and then compare that bit pattern to a previously-stored association of bit patterns to security classifications. A second drawback is that a significant amount of administrative overhead is required to support packet tagging: typically, the bit patterns must be registered to avoid inadvertent collisions, and these registered patterns must be defined for each supporting MLS system. An additional drawback of existing packet tagging techniques is that many are proprietary or vendor-specific. As a result, interoperability among MLS systems is limited. As yet another drawback, MLS systems that communicate with SLS systems as well as MLS systems must provide "dual path" processing. That is, because packets destined for SLS systems do not use packet tagging, an MLS system needs one set of logic for enforcing the security semantics of outbound packets destined for an SLS system, and a different set of logic when the outbound packets are destined for an MLS system. Similarly, a receiving MLS system needs one set of logic for inspecting packets that have packet tags, and another set of logic for inspecting packets that do not.

Furthermore, the requirement to process bit patterns for packet tagging is not limited to the endpoint MLS systems: each intermediary (such as routers, bridges, and firewalls) in the network path must also understand the packet tags and must enforce the semantics of the security classification based on the contents of those bit patterns, on a per-packet basis. To support packets with packet tags in their headers, special versions of these intermediaries are required. (When transmitting packets to and from SLS systems, in contrast, standard intermediary systems that base their route selection and permission decisions on standard packet headers can be used.)

These prior art drawbacks increase the cost of supporting multiple security classifications and also increase response time to users.

Accordingly, what is needed are improved techniques for supporting multi-level security, and in particular, for supporting communication between MLS systems.

SUMMARY OF THE INVENTION

An object of the present invention is to provide improved techniques for supporting multi-level security.

Another object of the present invention is to provide improved techniques for supporting communication between MLS systems.

A further object of the present invention is to avoid limitations of prior art MLS systems.

Yet another object of the present invention is to define techniques which enable supporting multi-level security but which avoid use of packet tagging.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides techniques for improving multi-level security systems. In one aspect, this technique comprises: defining, for each different security classification to be used by an MLS system, a unique source address; and using the unique source addresses as a source address in packets sent by the MLS system to one or more communication partner systems, thereby conveying the security classifications of the packets. In some cases, the unique source address used for one of the security classifications may be identical to a network address of the MLS system. Preferably, the unique source addresses are IP addresses.

The security classifications preferably classify data and/or access rights, and typically follow a hierarchical classification structure.

Using the unique source addresses preferably further comprises: determining the security classification of an outbound packet; obtaining the unique source address defined for the determined security classification; inserting the obtained source address into a source address field of a packet header of the outbound packet; and forwarding the outbound packet for transmission to one of the communication partner systems.

The disclosed techniques obviate a need to explicitly specify security classification information in the exchanged packets (and more particularly, to specify packet tags in the packet headers).

The present invention will now be described with reference to the following drawings, in which like reference numbers denote the same element throughout.

BRIEF DESCRIPTION OF THE DRAWINGS

FIG. 1 illustrates a simplified version of a configuration table used by MLS systems of the prior art;

DESCRIPTION OF PREFERRED EMBODIMENTS

Figure 2:
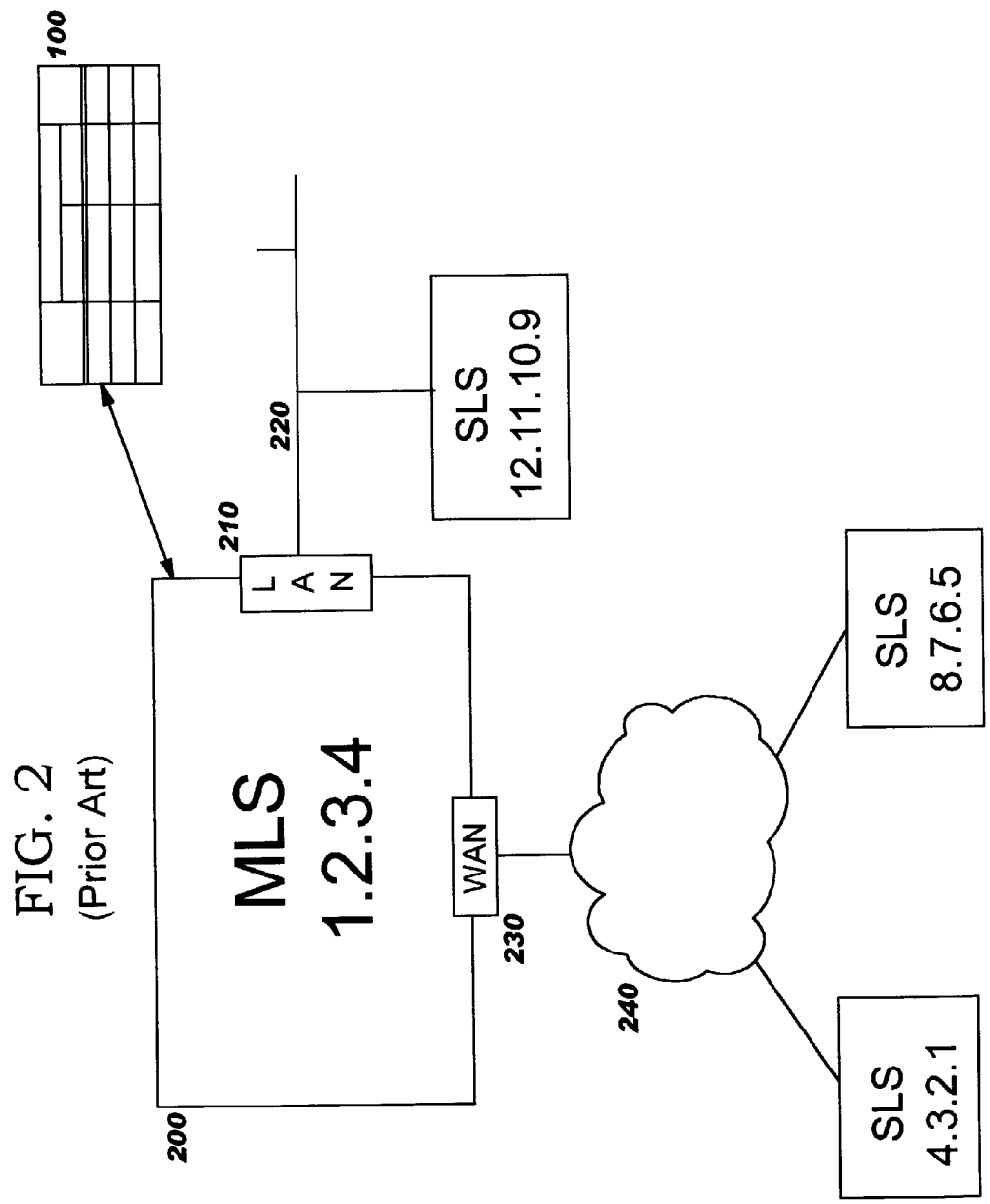
FIG. 2 shows an MLS system communicating with several SLS systems, according to the prior art.

The present invention provides improved techniques for supporting multi-level security, and removes the need for MLS systems transmitting data to other MLS systems to use packet tagging. Instead, an MLS system according to the present invention appears to its communicating partners (i.e., other MLS systems, SLS systems, and network intermediaries) as a collection or cluster of SLS systems. The term "pseudo-SLS system" is used hereinafter to refer to each of these SLS-like systems comprising an MLS system. No loss of security semantics occurs when using the present invention.

Before describing preferred embodiments in more detail, the manner in which a prior art MLS system operates will first be described.

As stated earlier, prior art MLS systems use configuration data to determine their permissible SLS communication partners and to determine whether a packet having a given security level can be sent to (or received from) a particular SLS partner. FIG. 1 shows a table 100 containing a simplified version of this configuration information, for purposes of illustration. Suppose that the MLS system for which this table 100 is defined is identified using its IP address, which has a value of "1.2.3.4". A partner identifier ("ID") column 110 contains an entry for each allowable partner of MLS system 1.2.3.4. According to this example table, the MLS system has been configured to communicate with three partners, which are identified (using their IP addresses, in this case) as "4.3.2.1", "8.7.6.5", and "12.11.10.9".

While the entries in column 110 identify specific partner systems, groups of IP addresses might also be used to identify a plurality of partners having identical security restrictions, when appropriate, as stated earlier. For example, a subnet address might be specified for the partner identifier, and a subnet mask or prefix might be associated with that subnet address to indicate how many IP addresses are to be covered. Use of subnet masks is well known in the art. As another example of specifying groups of IP addresses, a list or range of addresses might be explicitly specified as a partner identifier.

Table 100 also defines the allowable security level for communicating with each SLS partner of MLS system 1.2.3.4. Heretofore, security has been described in terms of a "security classification", making reference to security levels such as "top secret", "secret", "confidential", "unclassified", etc. In many governmental environments, security restrictions are enforced using not only the security level, but also one or more categories associated with that level. For example, one category of secret data might pertain to a government's budget, while another category of secret data pertains to personnel issues. Algorithms are known in the art for analyzing a combination of security level and category to determine access permissions for environments in which the security structures are hierarchical. Thus, a user "Alice" might be permitted to access data in the personnel category that has a security level of "top secret", as well as any personnel data from less-sensitive levels of the hierarchy. Another user "Carol" might be permitted to access data of any security level within the finance, strategy, or planning categories, yet Carol might be restricted to the lowest security level (e.g., unclassified) for personnel-related data. (The analysis process carried out by these algorithms is sometimes known as "dominance" and "equivalence" checking. The details of these algorithms are beyond the scope of the present invention.)

Columns 120 and 130 in the example table illustrate this combination of security level and category, forming what is referred to herein as a "security label" or "seclabel" 140. Subsequent discussions of security restrictions are in terms of seclabels for data packets. However, the inventive concepts disclosed herein may be used advantageously in environments where security classifications have a single component (i.e., a security level), and are not limited to an environment using a multi-component security label.

In this example, the MLS system can exchange data classified as "secret" and pertaining to finance with the SLS having network address 4.3.2.1. MLS system 1.2.3.4 can also exchange "top secret" planning data with the SLS having network address 8.7.6.5, and "secret" personnel data with the SLS having network address 12.11.10.9.

In some cases, an MLS system may have more than one physical network attachment. Referring briefly to FIG. 2, a prior art MLS system 200 is shown as having a network attachment 210 to an Ethernet local area network ("LAN") 220, on which SLS system 12.11.10.9 is located, and another network attachment 230 to a public network 240 through which SLS systems 4.3.2.1 and 8.7.6.5 can be reached. This MLS system 200 is shown as having an associated table 100 which stores configuration data pertaining to these SLS communication partners. Referring again to FIG. 1, table 100 contains a route column 150 that may be used for MLS systems with multiple network attachment points. This route column identifies, for each partner, which route (i.e., which network attachment point) enables communicating with that partner. In the example table, the routes have been identified as "WAN" (i.e., referring to the attachment 230 to wide area network 240 of FIG. 2) and "LAN" (referring to attachment 210 to LAN 220).

An actual MLS System may be quite complex, and its version of configuration table 100 may have many more entries, including many partner SLS systems, many different seclabels, and/or many different routes.

When a process in MLS system 200 has outbound data for one of the SLS systems, a security policy component (not shown in FIG. 2) consults the configuration table and compares the seclabel of the outbound data with the permissible (i.e., configured) seclabels for the destination address. If there is an entry in the table (in column 110) for this destination address (or for a group of which this destination is a member), and that entry has a seclabel (in column 140) that passes the dominance/equivalence algorithm, then the route from column 150 is used to forward the outbound packet to its destination. Otherwise, the packet is discarded.

A similar route look-up operation occurs in network intermediaries. For inbound packets, a table look-up operation at a receiving SLS system may be performed to determine whether the sender is known to this SLS system. Because an SLS system receives (and sends) data of a single seclabel, by definition, the SLS system is not aware of security labels. An SLS system is therefore not required to maintain information about seclabels for its partners or to check this information in inbound packets. (It is the responsibility of MLS systems to not send information to an SLS system, and not to deliver information received from an SLS system, when the SLS system has a seclabel not equivalent to the MLS system's user session. It is also the responsibility of the network administrator to use firewall systems to prevent communications between SLS systems with non-equivalent seclabels. The SLS systems themselves have no security label-based responsibility.)

When an MLS system communicates with another MLS system, the configuration table look-up technique described with reference to FIGS. 1 and 2 is inadequate to enforce security restrictions for communicating with the partner MLS system. For example, if partner 4.3.2.1 was an MLS system, it might support many concurrent user sessions, and this set of user sessions might span multiple security levels in the hierarchy for its finance category (that is, a particular user session has a single security label, but not all of the MLS system's user sessions are necessarily of the same security label). To differentiate packets for the various seclabels when communicating with this partner MLS system using prior art techniques, packet tags must be used. This prior art technique is illustrated in FIG. 3.

Figure 3:
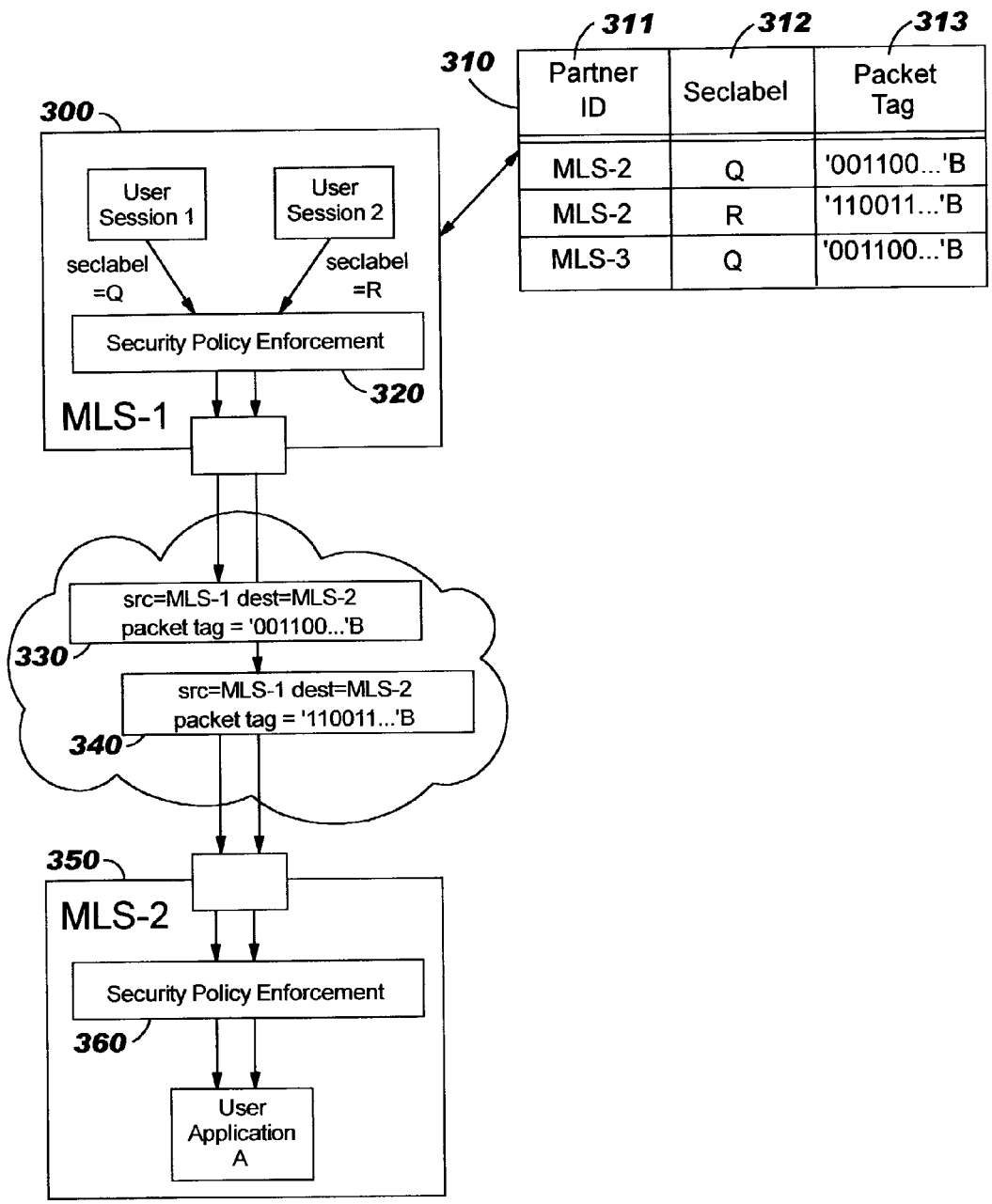
FIG. 3 shows how packet tags are used to differentiate security labels when one MLS system communicates with another using prior art techniques.

In FIG. 3, two MLS systems are shown. These MLS systems are identified as "MLS-1" (see reference number 300) and "MLS-2" (see reference number 350). In the example, MLS-1 is supporting two user sessions, denoted "User session 1" and "User session 2". Suppose that each of these user sessions connects to an application called "User application A" in MLS-2. This might be a finance application, for example, or any other type of application running in an MLS System. Further suppose that the user associated with User session 1 is allowed to view top secret data from User application A, but that the user associated with User session 2 is only allowed to view secret data from this application. An abbreviated form of the seclabels will be used hereinafter, and in the example of FIG. 3, the seclabel corresponding to User session 1 will be referred to as "Q" (rather than "Top secret User application A") and the seclabel corresponding to User session 2 will be referred to as "R" (rather than "Secret User application A"). A configuration table 310 is depicted for MLS-1, which is similar to configuration table 100 of FIGS. 1 and 2. The partner ID column 311 in table 310 is shown using names, rather than IP addresses, for ease of illustration. Thus, table 310 indicates that MLS-1 is configured to communicate with partners MLS-2 and MLS-3. The seclabel column 312 is shown in abbreviated form, and indicates that MLS-1 can exchange packets having seclabel Q or R with MLS-2, but it can only exchange packets having seclabel Q with MLS-3. A packet tag column 313 specifies the bit patterns that represent each seclabel within packet headers. In this example, seclabel Q is represented by a bit string beginning with "001100", and seclabel R is represented by a bit string beginning with 110011'. (The format of table 310 is merely illustrative, and is not meant to suggest that all implementations of multi-level security store the bit patterns in each row of a table. It is more likely that the bit patterns are stored separately, in a table or other structure indexed by seclabels or bashed versions thereof.) Note that routes have been omitted firm table 310 for ease of illustration.

Both user sessions are shown as sending an outbound packet to a component referred to as "security policy enforcement" 320. (Although not shown, a component of this type is typically present in the MLS system 200 of FIG. 2.) This component consults configuration policy information, such as table 310, to determine whether the target destination for this packet is a permitted partner system, what route to use when sending packets to that partner, whether packets having this user session's seclabel can be sent to that partner, and the bit pattern that represents this seclabel. Suppose the security policy enforcement component determines that MLS-1 can send packets having seclabels A, Q, R, or V to MLS-2. (Although system names are used in the present example, the IP address of the destination is typically used in the security policy, and not its name.) Thus, the outbound packets from both User session 1 (having seclabel Q) and from User session 2 (having seclabel R) are allowable. According to the prior art, the bit pattern representing seclabel Q is appended to the packet from User session 1, and the bit pattern representing seclabel R is appended to the packet from User session 2. These packets are shown at reference numbers 330 and 340, respectively. The headers of these packets are depicted at a high level, where each includes a source address ("src=MLS-1"), a destination address ("dest=MLS-2"), and the seclabel information ("packet tag= . . . ").

Upon arriving at the destination system MLS-2, the packets are analyzed by a security policy enforcement component 360, which performs operations similar to component 320. That is, the inbound packet headers are inspected, and the bit patterns are compared to stored information to determine that packet 330 contains data of seclabel Q and packet 340 contains data of seclabel R. (MLS-2 has a configuration table similar to MLS-1's table 310, although this has not been shown in FIG. 3.) MLS-2's security policy might specify that packets from MLS-1 (i.e., from the network address of MLS-1) are permissible for forwarding to User application A if they have seclabel Q, R, or Z. In that case, packets 330 and 340 will both be forwarded to the target application.

The scenarios which have been described with reference to FIGS. 1-3 more fully illustrate the previously-discussed drawbacks of prior art techniques, which include dual-path processing as well as packet tagging overhead. The manner in which preferred embodiments avoid these drawbacks will now be described.

According to preferred embodiments, each pseudo-SLS system within an MLS system is given a distinct network address, which for purposes of illustration is referred to herein as an IP address. Each of these pseudo-SLS systems supports user sessions having a single security classification, as in a true SLS system. These distinct network addresses are then used as source addresses in outbound packet headers. Thus, referring to FIG. 3, packet 330 from User session 1 will be identified as originating from one source address while packet 340 from User session 2 will be identified as originating from a different source address. Techniques for associating multiple IP addresses with a single physical device are known in the art. One commonly-used technique is referred to as "aliasing" or defining aliases; another is use of "virtual IP addresses", or "VIPA". It is not known, however, to use an alias address or VIPA as the source address in a packet to imply a seclabel for that packet.

Figure 4:
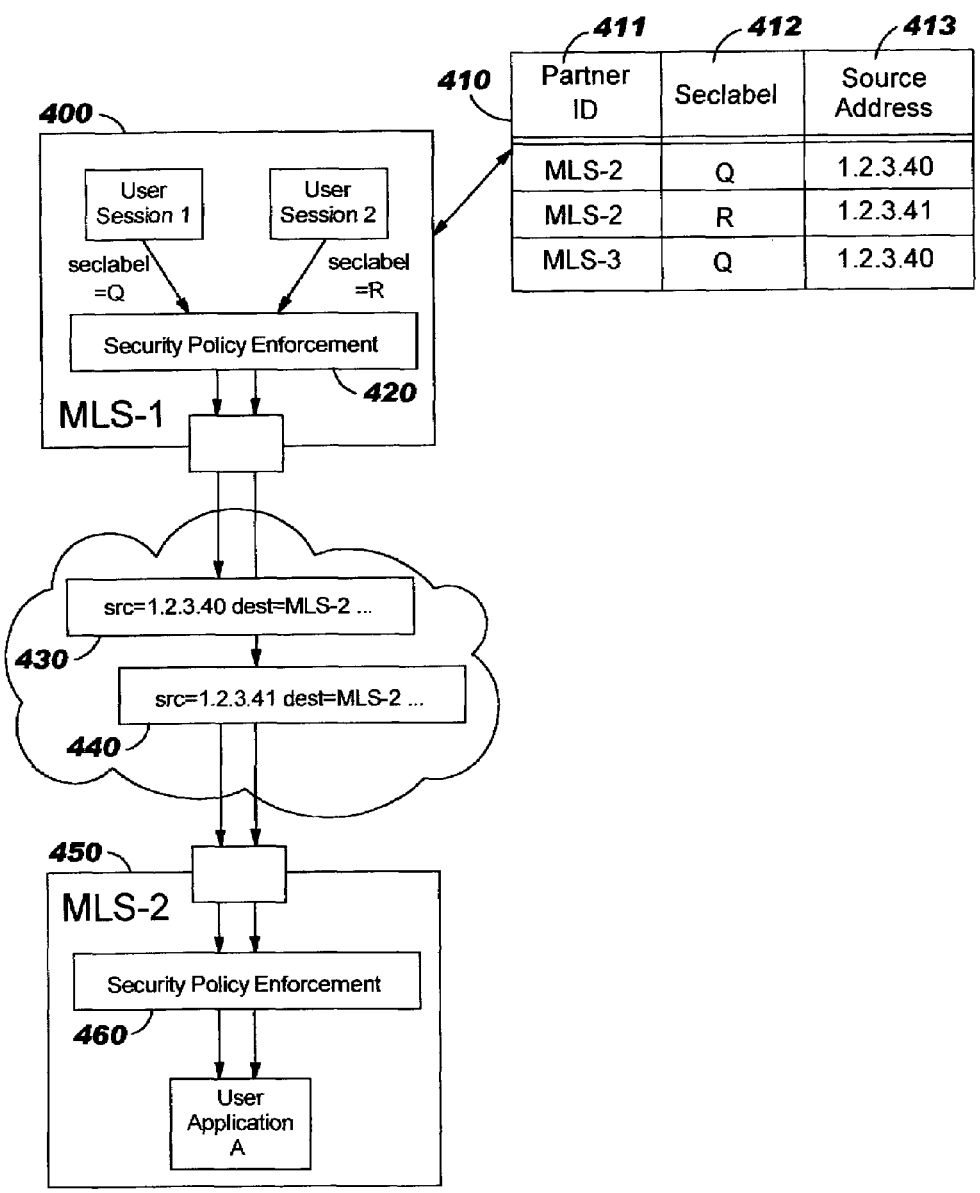
FIG. 4 shows how this communication occurs according to preferred embodiments of the present invention.

For an MLS system that supports "N" different seclabels, "N" distinct source addresses will be defined. Whether these N addresses are distinct from the true device address of the MLS system, or whether the device's own address is used as one of the N addresses, is immaterial. Turning now to FIG. 4, a revised configuration table 410 is shown, which stores information for pseudo-SLS systems according to preferred embodiments. In this example, suppose that MLS-1's true network address is 1.2.3.4. Seclabels Q and R use different network addresses, shown in table 410 as 1.2.3.40 and 1.2.3.41, respectively.

In FIG. 4, MLS system 400 operates according to the present invention, and when its user sessions 1 and 2 have outbound data to send, the security policy enforcement component 420 also operates according to the present invention. In preferred embodiments, component 420 performs a look-up operation for each outbound packet to determine the source address to be used for the packet's seclabel. So, upon determining that User session 1 has data of seclabel Q to send to MLS-2, component 420 obtains the source address value associated with this seclabel (which in the example is 1.2.3.40), and replaces the source address of MLS-1 with that source address. Similarly, the source address associated with seclabel R (1.2.3.41) is inserted into the packet header for User session 2's outbound packet.

It should be noted that the described delineation of function among various components in an MLS system is merely illustrative of one way in which the present invention may be implemented. Alternatives include having a component such as component 420 contact a seclabel-to-source-address mapping function, rather than performing the look-up itself, and/or passing the obtained pseudo-SLS system source address to a packet-building component for insertion into an outbound packet, rather than doing the source address replacement itself.

As discussed with reference to table 310 in FIG. 3, the format of table 410 is merely illustrative. It may be preferable to use separate tables, where one table defines the permitted partners and seclabels and another table defines the mapping between seclabels and source addresses. Furthermore, it should be noted that references herein to use of "tables" is not intended to imply a particular storage format for the described data. Other data structures may be used without deviating from the scope of the present invention.

Packets 430 and 440 are to be contrasted to packets 330 and 340 of FIG. 3, and show how the source address of the pseudo-SLS system has been used in the packet header when using the present invention, obviating the need to include packet tags and their variable-length bit patterns. Note that packets 430 and 440 can therefore be analyzed and routed by standard intermediaries in the network.

When packets 430 and 440 arrive at MLS-2 450, the source address can be efficiently inspected by security policy component 460 to determine whether the "SLS" systems sending these packets are permitted partners of MLS-2 (and more particularly, of the application on MLS-2 for which the packets are destined). The policy at MLS-2 might indicate, for example, that packets from a system (which MLS-2 believes is an SLS system) having source address 1.2.3.41 are from an acceptable communications partner, and that this SLS sends packets having seclabel Q. Because MLS-2 already has support for receiving packets from an SLS, where the seclabel of that packet is implied (i.e., does not use explicit packet tagging, but is instead inferred from the packet's source address), no new processing is required in an MLS system to support inbound packets when using the present invention. Accordingly, MLS-2 450 may be an MLS system implementing the present invention, or it may be a back-level MLS system: provided the back-level MLS system supports communication with an SLS system, the packets from MLS-1's pseudo-SLS systems will be correctly processed on a back-level system as well as on an MLS implementing the present invention. (This backward compatibility allows the present invention to be deployed incrementally within a computing environment in many cases.)

The configuration table for MLS-2 has not been shown in FIG. 4. If MLS-2 implements the present invention, then it will have a table similar to table 410; otherwise, it will have a table similar to table 310 of FIG. 3. (Note that the partner MLS system is not required to use the same names or identifiers for the seclabels it shares with another MLS system, provided administrators at the various MLS systems provide for mapping/defining the configuration data in a way that enables the security policy enforcement component to determine and enforce the seclabel semantics for the name/identifier used at that MLS system. For example, one MLS system may assign the integer 20 to the level named "Secret", while another MLS system uses the integer 35 and the name "Confidential". If the security administrators agree that the usage semantics of these two definitions are equivalent, then they can each associate their own label with the other system's IP address. Since the label names and representative bit patterns are never exchanged, the two MLS systems can still communicate securely.)

Figure 5:
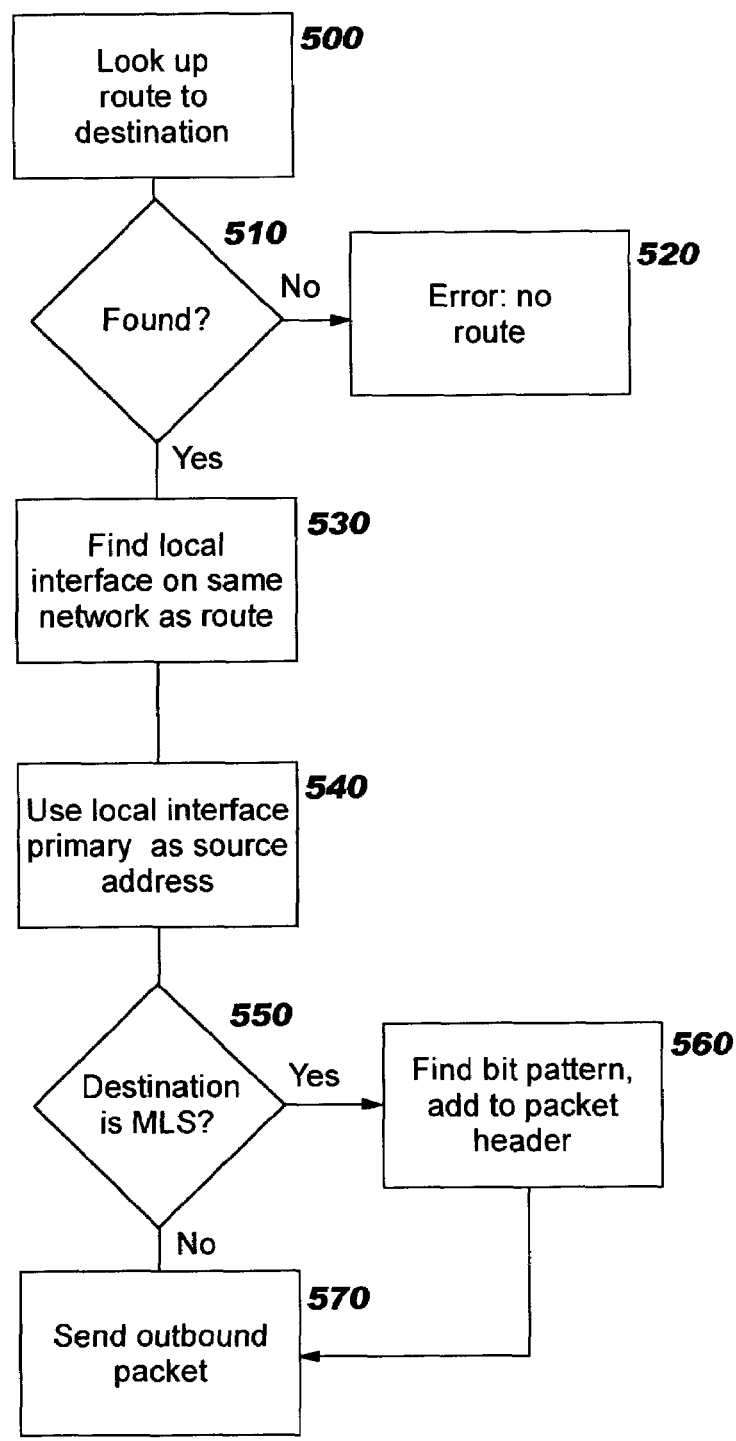
FIGS. 5 and 6 provide flowcharts depicting logic that may be used when an MLS system is sending outbound packets according to the prior art and according to preferred embodiments of the present invention, respectively.
Figure 6:
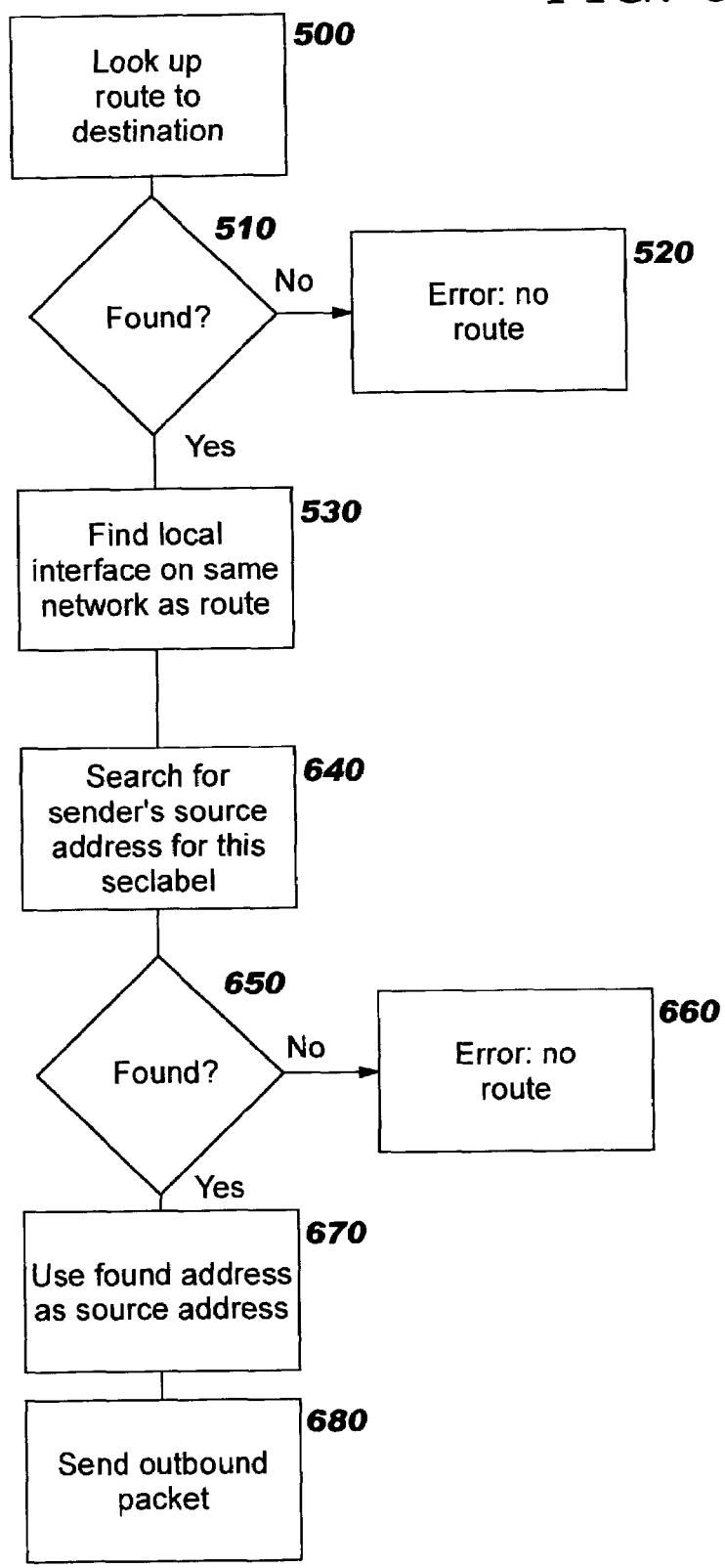

Referring now to FIGS. 5 and 6, flowcharts are provided depicting logic that may be used when an MLS system is sending outbound packets according to the prior art (FIG. 5) and according to preferred embodiments of the present invention (FIG. 6).

The process of sending an outbound packet according to the prior art begins at Block 500 by determining whether a route to the destination exists. See, for example, column 150 of table 100 in FIG. 1. If no route was found, then Block 510 has a negative result, and an error condition exists (Block 520). The packet will be discarded, and the processing of FIG. 5 ends for this packet (ignoring, for simplicity, any error handling that may be performed). If a route was found, however, then processing continues at Block 530.

Block 530 searches for the local interface (referred to earlier as a network attachment point) on the same network as the route. The primary address of this local interface is used as the source address in the packet header for this outbound packet (Block 540). For example, with reference to the prior art scenario in FIG. 2, the network address of WAN attachment 230 would be used as the source address for packets destined for the route that goes through public network 240, whereas the network address of LAN attachment 210 would be used as the source address for packets that will be sent to the Ethernet LAN 220.

Block 550 checks to see if the destination of this outbound packet supports or requires seclabels. This test has a positive result if the destination is another MLS system; SLS systems, as stated above, imply the seclabel and therefore do not support or require explicit seclabels. Accordingly, when the test in Block 550 has a positive result, Block 560 finds the bit pattern that represents the seclabel of this packet and adds it to the packet header.

After adding the bit pattern to the packet header, or when the bit pattern is not used, the packet is then forwarded to the local interface (Block 570) for transmission to the network.

Several steps in processing an outbound packet according to the present invention are analogous to the prior art processes. In particular, a determination is made as to whether a route to the destination exists, and if not, an error condition exists. If a route was found, however, then a search is made for the local interface on the same network as the route (Block 530).

At this point, the processing of FIG. 6 diverges from FIG. 5. Rather than using the address of the local interface as the source address in the packet header for this outbound packet, the MLS system must correctly select which local IP address (i.e., an IP address for this MLS system or for one of its pseudo-SLS systems) it will use as the source address for each outbound packet. Accordingly, Block 640 searches, using the outbound packet's seclabel, to determine whether a sender source address is defined for that seclabel. For example, with reference to the scenario in FIG. 4, if the packet being processed is from User session 2, having seclabel R, then Block 640 will locate the IP address 1.2.3.41 as shown in table 410.

Block 650 tests to see if the search failed to locate a sender source address for this seclabel. If so, then this is an error condition (Block 660) and the packet will be discarded. Otherwise, processing continues at Block 670, where the located sender source address is used as the source address for the outbound packet.

Note that the processing of Blocks 640-670 presumes that an entry in table 410 is created for partner systems that are SLS systems as well as for partner MLS systems. The entries for an SLS system partner preferably use an identical format to those for MLS system partners. Thus, an entry "SLS-B, R, 1.2.3.41" might be added to table 410 for sending packets of seclabel R to an SLS system identified as "SLS-B". By using the same format in the configuration data for both types of partner systems, the dual-path processing of the prior art—and its inherent inefficiencies—are avoided.

After inserting or replacing the source IP address in the packet header with the located sender source address, Block 680 forwards the packet to the local interface for transmission to the network, and the processing of FIG. 6 is then complete for this outbound packet.

Administration requirements of preferred embodiments are to define the separate source addresses for each potential seclabel of an MLS system's outbound packets, and to ensure that client applications connect to an address that has the proper seclabel.

It should be noted that in some cases, an application may explicitly request that its packets use a particular source address. In the prior art, if the packet is destined for an MLS system, the explicit packet tags are the definitive specification of the packet's seclabel. When using the present invention, however, the security policy enforcement component must ensure that the explicitly-requested source address corresponds to the seclabel of the requester.

As has been shown, an MLS system communicating with some partners that are SLS systems and other partners that are MLS systems can leverage the same code and configuration data formats for both. Other MLS systems and intermediary systems do not need to be aware that the system implementing the present invention is an MLS system, nor do they need to rely on explicit packet tags to determine the correct seclabel to associate with each transmitted packet. Other systems use their existing configuration support for associating seclabels with SLS systems according to the IP address of those SLS systems. The techniques of the present invention offer a number of advantages over prior art techniques, including much simpler and more efficient packet processing, simplified administration, and improved interoperability. While preferred embodiments are described in terms of security labels that comprise a security level and one or more categories, this is for purposes of illustration and not of limitation. The techniques of the present invention may be used advantageously in environments where the security label represents other types of security information, including a security level and a single category or a security level standing alone. Furthermore, while references herein are to "packets", the present invention may be used advantageously in any type of datagram having a source address field.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flow diagrams and/or block diagrams of methods, apparatus (systems), and computer program products according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While preferred embodiments of the present invention have been described, additional variations and modifications may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A computer-implemented method of providing multi-level security systems, comprising steps of:
    defining, for each of a plurality of different security classifications to be used by a first multi-level security ("MLS") system when sending outbound packets to a second MLS system, a unique source address; and
    for each of the outbound packets sent from the first MLS system to the second MLS system, performing steps of:
        determining, by the first MLS system, a particular one of the security classifications that applies to the outbound packet;
        locating, by the first MLS system, the unique source address defined for the determined particular one;
        replacing, by the first MLS system a source address in a packet header of the outbound packet with the located unique source address, thereby conveying the security classification that applies to the outbound packet through the source address in the packet header; and
        sending, by the first MLS system responsive to the replacing step, the outbound packet to the second MLS system.

2. The method according to claim 1, wherein the unique source address used for one of the security classifications is identical to a network address of the first MLS system.

3. The method according to claim 1, wherein the unique source addresses are Internet Protocol ("IP") addresses.

4. The method according to claim 1, wherein the security classifications classify data and/or access rights.

5. The method according to claim 4, wherein the security classifications follow a hierarchical classification structure.

6. The method according to claim 1, wherein the security classifications comprise a security level and a category.

* * * * *